United States Patent
Boyce et al.

(10) Patent No.: US 10,027,970 B2
(45) Date of Patent: *Jul. 17, 2018

(54) RENDER-ORIENTATION INFORMATION IN VIDEO BITSTREAM

(71) Applicant: VIDYO, INC., Hackensack, NJ (US)

(72) Inventors: Jill Boyce, Portland, OR (US); Stephen Cipolli, Nanuet, NY (US); Jonathan Lennox, Jersey City, NJ (US); Stephan Wenger, Hillsborough, CA (US); Danny Hong, New York, NY (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,969

(22) Filed: Jul. 21, 2017

(65) Prior Publication Data

US 2017/0324971 A1    Nov. 9, 2017

Related U.S. Application Data

(63) Continuation of application No. 13/347,984, filed on Jan. 11, 2012, now Pat. No. 9,743,099.

(60) Provisional application No. 61/451,303, filed on Mar. 10, 2011.

(51) Int. Cl.
| | |
|---|---|
| H04N 7/26 | (2006.01) |
| H04N 19/46 | (2014.01) |
| H04N 19/85 | (2014.01) |
| H04N 19/70 | (2014.01) |

(52) U.S. Cl.
CPC ............. *H04N 19/46* (2014.11); *H04N 19/85* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 4,703,515 A | 10/1987 | Baroody, Jr. | |
| 6,466,624 B1 | 10/2002 | Fogg | |
| 7,050,645 B2 | 5/2006 | Sato et al. | |
| 2003/0152291 A1* | 8/2003 | Cheatle | G06K 9/32 |
| | | | 382/296 |
| 2004/0056872 A1 | 3/2004 | Pai et al. | |
| 2006/0268984 A1 | 11/2006 | Kim et al. | |
| 2007/0230826 A1 | 10/2007 | Moroo et al. | |
| 2008/0130735 A1 | 6/2008 | Meric | |
| 2009/0086827 A1 | 4/2009 | Wu et al. | |
| 2009/0110372 A1 | 4/2009 | Morioka et al. | |

(Continued)

FOREIGN PATENT DOCUMENTS

| | | |
|---|---|---|
| CN | 1499442 A | 5/2004 |
| EP | 0738075 | 10/1996 |

(Continued)

OTHER PUBLICATIONS

U.S. Appl. No. 13/162,074 (Abandoned), filed Jun. 16, 2011.

(Continued)

Primary Examiner — Frederick D Bailey
(74) Attorney, Agent, or Firm — Baker Botts LLP

(57) ABSTRACT

Disclosed are techniques for creating, coding, decoding, and using, rotation information related to one or more coded pictures in non-normative parts of a coded video bitstream.

15 Claims, 7 Drawing Sheets

(56) References Cited

U.S. PATENT DOCUMENTS

| | | | |
|---|---|---|---|
| 2009/0295907 A1* | 12/2009 | Kim | H04N 19/597 348/43 |
| 2010/0027663 A1 | 2/2010 | Dai et al. | |
| 2010/0183071 A1 | 7/2010 | Segall et al. | |
| 2010/0246680 A1* | 9/2010 | Tian | H04N 19/00569 375/240.16 |
| 2010/0254617 A1 | 10/2010 | Hwang et al. | |
| 2010/0272187 A1 | 10/2010 | Civanlar et al. | |
| 2010/0309286 A1 | 12/2010 | Chen et al. | |
| 2011/0157421 A1 | 6/2011 | Chuang et al. | |
| 2011/0286530 A1* | 11/2011 | Tian | H04N 21/2365 375/240.25 |
| 2012/0106622 A1 | 5/2012 | Huang et al. | |

FOREIGN PATENT DOCUMENTS

| | | |
|---|---|---|
| EP | 1998554 | 12/2008 |
| JP | H06-102855 | 4/1994 |
| JP | H08-336069 | 12/1996 |
| JP | 2001-45354 | 2/2001 |
| JP | 2003-264793 | 9/2003 |
| JP | 2005-328279 | 11/2005 |
| JP | 2007-328693 | 12/2007 |
| JP | 2009-94741 | 4/2009 |
| WO | WO 2007/108458 A1 | 9/2007 |
| WO | WO 2008/001441 A1 | 1/2008 |
| WO | WO 2010/085361 A2 | 7/2010 |

OTHER PUBLICATIONS

U.S. Appl. No. 13/347,984 (U.S. Pat. No. 9,743,099), filed Jan. 11, 2012, (Aug. 22, 2017).
U.S. Appl. No. 13/423,671 (Abandoned), filed Mar. 19, 2012.
U.S. Appl. No. 13/162,074, Jun. 21, 2013 Non-Final Office Action.
U.S. Appl. No. 13/162,074, Jul. 17, 2013 Response to Non-Final Office Action.
U.S. Appl. No. 13/162,074, Sep. 30, 2013 Final Office Action.
U.S. Appl. No. 13/162,074, May 22, 2014 Notice of Abandonment.
U.S. Appl. No. 13/347,984, Jul. 12, 2017 Issue Fee Payment.
U.S. Appl. No. 13/347,984, Jul. 6, 2017 Notice of Allowance.
U.S. Appl. No. 13/347,984, Nov. 23, 2016 Reply Brief Filed.
U.S. Appl. No. 13/347,984, Oct. 7, 2016 Examiner's Answer to Appeal Brief.
U.S. Appl. No. 13/347,984, Jul. 19, 2016 Appeal Brief Filed.
U.S. Appl. No. 13/347,984, May 18, 2016 Notice of Appeal Filed.
U.S. Appl. No. 13/347,984, Mar. 29, 2016 Final Office Action.
U.S. Appl. No. 13/347,984, Jan. 22, 2016 Response to Non-Final Office Action.
U.S. Appl. No. 13/347,984, Oct. 22, 2015 Non-Final Office Action.
U.S. Appl. No. 13/347,984, Jun. 8, 2015 Advisory Action.
U.S. Appl. No. 13/347,984, Jun. 8, 2015 Amendment and Request for Continued Examination (RCE).
U.S. Appl. No. 13/347,984, May 28, 2015 Response after Final Office Action.
U.S. Appl. No. 13/347,984, Mar. 31, 2015 Final Office Action.
U.S. Appl. No. 13/347,984, Jan. 22, 2015 Response to Non-Final Office Action.
U.S. Appl. No. 13/347,984, Sep. 11, 2014 Non-Final Office Action.
U.S. Appl. No. 13/423,671, Apr. 23, 2014 Non-Final Office Action.
U.S. Appl. No. 13/423,671, Nov. 19, 2014 Notice of Abandonment.
"Frame coding in vertical raster scan order"; Do-Jyoung Kwon; Joint Collaborative Team on Video Coding (JCT-VC) of ITU-T SG16 WP3 and ISO/IEC JTC1/SC29/WG11; Guangzhou, CN, Oct. 7-15, 2010: pp. 1-4.
"Sub-picture based raster scanning coding order for HEVC UHD video coding"; Minhua Zhou; Joint Collaborative Team on Video Coding (JCT-VC) of ITU-T SG16 WP3 and ISO/IEC JTC1/SC29/WG11; Geneva, CH, Jul. 21-28, 2010: pp. 1-5.
International Search Report and Written Opinion for PCT/US2011/040671, dated Oct. 11, 2011.
International Search Report and Written Opinion for PCT/US2012/020890, dated Apr. 30, 2012.
International Telecommunication Union, Rec. ITU-T H. 264(Mar. 2009)—Prepublished version, Series H:Audiovisual and Multimedia Systems, the USA, Internet <URL:http://wftp3.itu.int/av-arch/jvt-site/2009_11_ Geneva/JVT-AF11.zip>, Oct. 26, 2009, p. 357, 387, 388, and 390.
Siemens, "Optional simple still image and file transfer mode", *LBC Meeting (ITU Low Bitratecoding Group*, No. LBC-94-182 (40 pages) (Oct. 1994).

\* cited by examiner

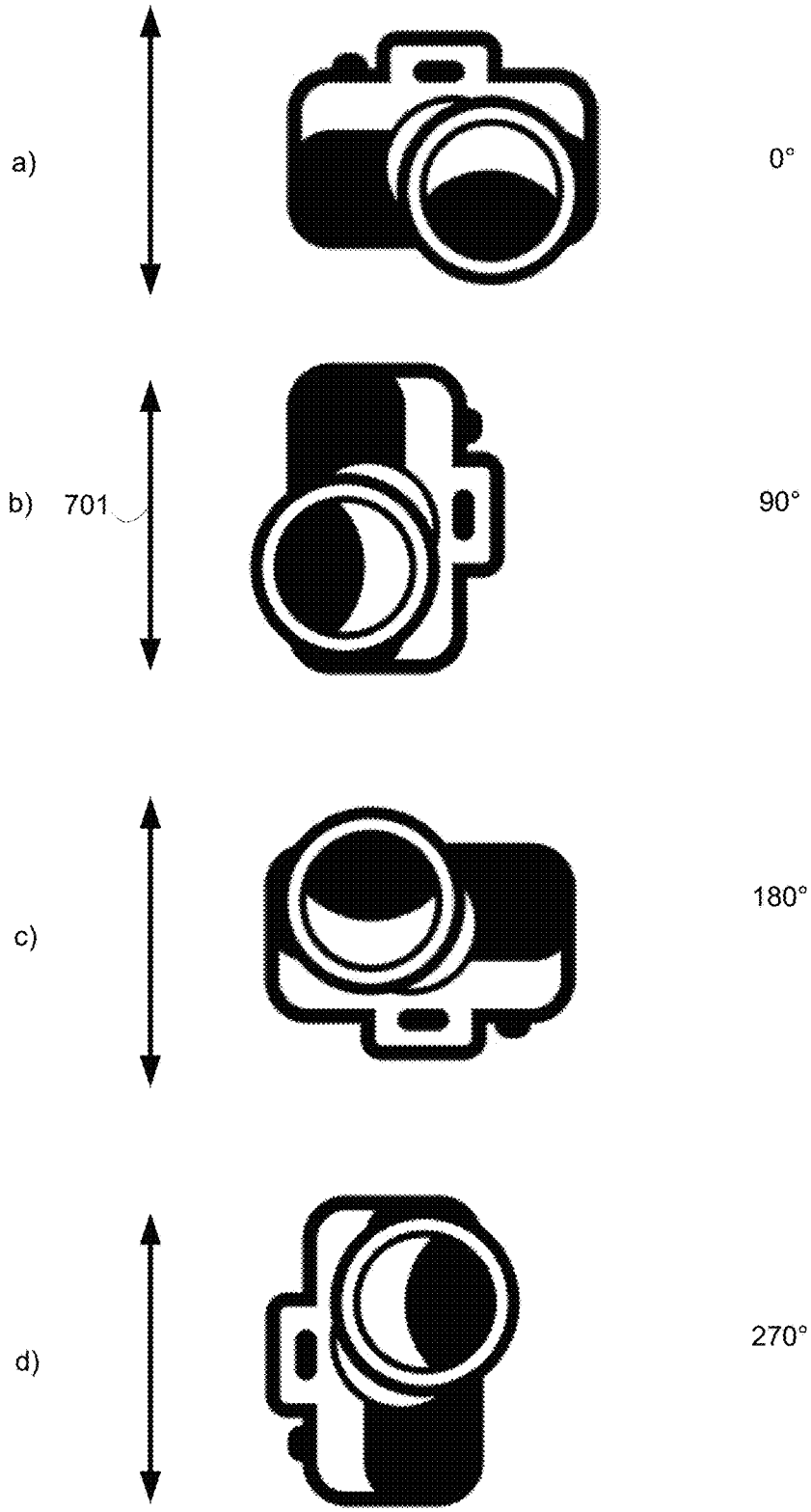

RENDER-ORIENTATION INFORMATION IN VIDEO BITSTREAM

CROSS-REFERENCE TO RELATED APPLICATION

This application is a continuation of U.S. patent application Ser. No. 13/347,984, filed Jan. 11, 2012, which claims priority to U.S. Provisional Patent Application No. 61/451,303, filed Mar. 10, 2011, the entire contents of which are hereby incorporated by reference in their entirety and from which priority is claimed.

FIELD

The present application relates to video coding, and more specifically, to the representation of information related to the spatial orientation of a reconstructed video bitstream, inside the video bitstream.

BACKGROUND

This application claims priority to U.S. Provisional App. Ser. No. 61/451,303, titled "Render Orientation Information in Video Bitstream, filed Mar. 10, 2011, the disclosure of which is hereby incorporated by reference in its entirety.

Certain video coding standards were conceived in the context of video conferencing and digital TV environments, where the spatial resolution and orientation of a captured or reconstructed video signal can be the same on the capture/encoder and decoder/display site. For example, a TV signal can be captured in landscape format at 4:3 or 16:9 aspect ratio, and is rendered also in landscape format (though the aspect ratio may be adjusted in the receiving TV based on user preferences). Coincidentally, certain video compression standards, including ITU-T Rec. H.261, H.262, H.263, H.264, (all available from the International Telecommunication Union ("ITU"), Place de Nations, CH-1211 Geneva 20, Switzerland or www.itu.int), and MPEG-1 visual (formally known as ISO/IEC 11172-2), and MPEG-4 visual (formally known as ISO/IEC 14496-2), available from the International Organization for Standardization ("ISO") 1, ch. de la Voie-Creuse, Case postale 56, CH-1211 Geneva 20, Switzerland, or www.iso.org,] (all incorporated herein by reference in their entirety), do not include information related to the spatial orientation of the captured video signal.

The use of screens connected to computer-based decoders/rendering devices, be they located on Personal Computers (PCs), set-top-boxes, mobile devices such as cell phones and tablet computers, or any other similar device, allows to render a video image also in orientations that are not the native orientation of the device, for example by putting them in a "window" on the screen. Some of the aforementioned devices allow, inherently due to their form factor as they are handheld, or by technical means (swivel monitors), to be viewed in more than one orientation. Operating systems and GUIs may not care about the "native" orientation of a reconstructed video signal.

What was mentioned above applies, in concept, equally to the capture side. While, today, TV and video conferencing visual signals can be (and mostly are) captured in landscape mode, there is no technical reason not to rotate the camera around its capturing axis, and thereby capture at a different orientation. Doing so can require the rendering device to rotate the reconstructed picture as well, so to enable a natural viewing experience.

Without having a mechanism that allows, in the video bitstream, an indication of the orientation of a to-be-rendered video bitstream (after reconstruction), a rendering device cannot make an informed decision for the rendering orientation, which can lead to a bad user experience.

Further, it is an option for artistic expression of a movie producer to rotate a camera during production. For or a faithful viewing experience, the rotation needs to be synchronized with the video content, as it can change during a sequence. This makes file format based orientation information, such as the one known from extensions to the JFIF standard (Draft ISO/IEC 10918-5, available from the International Organization for Standardization ("ISO") 1, ch. de la Voie-Creuse, Case postale 56, CH-1211 Geneva 20, Switzerland, or www.iso.org and incorporated herein by reference) incapable to provide the desired functionality. For a meaningful synchronization of camera orientation with video content, orientation information needs to be available in the video bitstream.

Therefore, it can be desirable, in a video bitstream, to have a mechanism that allows to signal the orientation of a to-be-reconstructed bitstream.

SUMMARY

The disclosed subject matter provides for side information, inside a video bitstream, to indicate the orientation of the video signal resulting from the bitstream after reconstruction.

In one embodiment, a single bit in the video bitstream indicates either "portrait" and "landscape" mode.

In the same or another embodiment, two bits in the video bitstream indicate a 0/90/180/270 degree deviation from landscape mode. In the same or another embodiment, two bits in the video bitstream indicate a 0/90/180/270 degree deviation from portrait mode.

In the same or another embodiment, two bits in the video bitstream indicate a 0/90/180/270 degree deviation from the last known camera position.

In the same or another embodiment, two bits in the video bitstream indicate a 0/90/180/270 degree deviation from the axis of gravity. FIGS. 7a, 7b, 7c, 7d show a camera positioned at 0, 90, 180, and 270 with respect to the axis of gravity (701). In FIG. 7b, the axis of gravity (701) is also the natural orientation of the camera.

In the same or another embodiment, an integer or floating-point number, coded according to an appropriate entropy coding scheme and located in the bitstream, indicates a degree of orientation change from landscape, portrait, from the last known camera position, or from the axis of gravity.

In the same or another embodiment, two bits in the video bitstream (or an integer or floating-point number, coded according to an appropriate entropy coding scheme and located in the bitstream) indicate a 0/90/180/270 degree (or different degree, as indicated by the integer or floating point number) deviation from a natural orientation of the camera or an unspecified orientation.

In the same or another embodiment, a bit indicates a horizontal flip.

In the same or another embodiment, a bit indicates a vertical flip.

In the same or another embodiment, a persistence information, coded as an integer or floating point value, indicate the persistence of the rotation information, measured in any one of time, frame intervals, or picture order count intervals.

In the same or another embodiment, any of the aforementioned bits or entropy coded numbers are coded in a Supplementary Enhancement Information message in the video bitstream.

In the same or another embodiment, any of the aforementioned bits or entropy coded numbers are coded in a Visual Usability Information (VUI) part of a parameter set, which can be located in the video bitstream, or can be conveyed out of band.

BRIEF DESCRIPTION OF THE DRAWINGS

Further features, the nature, and various advantages of the disclosed subject matter will be more apparent from the following detailed description and the accompanying drawings in which:

FIG. 7 is a schematic illustration of a camera oriented with respect to an axis of gravity.

Figure 1:
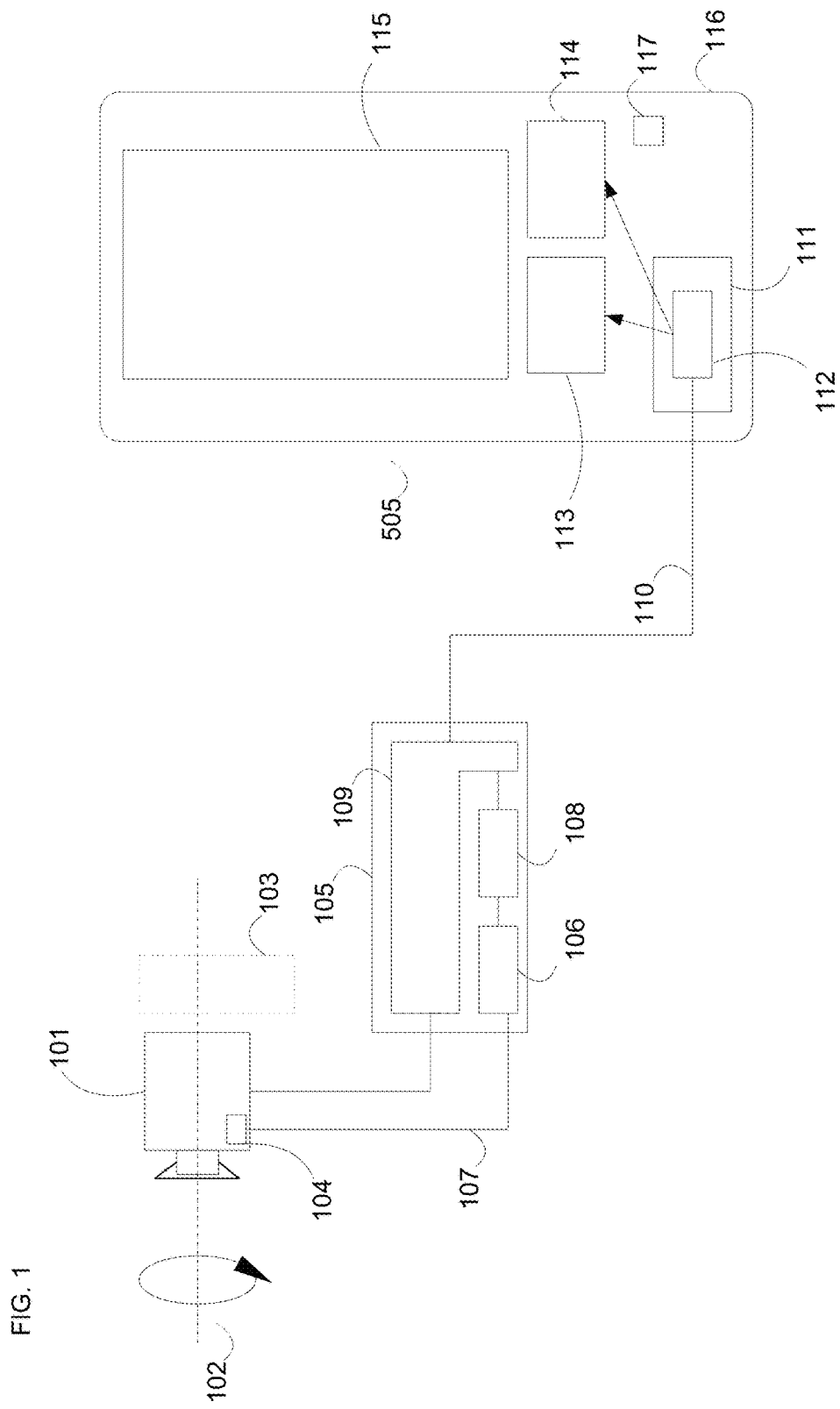
FIG. 1 is a schematic illustration of a system in accordance with an embodiment of the present invention.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

FIG. 1 shows, as an example for an application of the disclosed subject matter, the relevant parts of a video conferencing system. A camera (101) captures a scene. The camera can be rotated around its axis of capture (102), manually or through a motorized camera head (103). (The camera head is shown in dashed lines as it is optional.) A sensor (104) located (as depicted) in the camera (101), the camera head (103), or another suitable location, can be used to identify the capture orientation of the camera (101). Alternatively, the camera head can also provide the orientation directly, when an open loop (sensorless) control of the camera rotation is implemented. For example, it is possible that an operator manually sets up the camera in a horizontal (landscape) orientation, and the camera head rotates the camera using a stepper motor, where each step accounts to a rotation by, for example 1 degree. By counting the stepper pulses sent to the motor, the camera head "knows" the orientation of the camera without a sensor. It is equally possible that the camera is in a fixed position, where any position other than landscape position (axis of gravity perpendicular to the horizontal scan lines of the picture) makes the use of the disclosed techniques.

Coupled to the camera (101) is a video encoder (105), which can include an orientation determination module (106). The orientation determination module (106) can receive its input (107) from the sensor (104), or the camera head (103) or any other suitable device, or it can derive the orientation from the video content, for example by observing the horizon of a scene, the orientation of humans in the scene, the direction of gravity as shown by falling objects, and similar. Coupled to the orientation determination module can be an orientation coding module (108). The orientation coding module (108) can be encoding the orientation determined by the orientation determination module (106) into an appropriate place in the video bitstream. In order to do so, the orientation coding module (108) can interact with the rest of the bitstream generation (109) in the encoder (104), for example to determine the correct position of the orientation indication bits in the bitstream. Examples for possible representations of orientation information as one or more bits are described later. The various modules described herein can include any suitable combination of hardware and software.

The output of the encoder (105) is a coded video bitstream (110), which, after certain interim steps (such as: embedding into a file format, packetization, distribution, for example over a network, depacketization, and so on) can arrive at the decoder (111).

In the decoder (111), an orientation decoding module (112) can extract the bits representing the orientation information from the bitstream. The remainder of the decoding process outside the orientation decoding module is handled as usual, and the result is a series of images of the captured resolution, typically in landscape mode.

The orientation decoding module (112) can decode the orientation information in the bitstream, for example by following an inverse process of the orientation information encoding. The resulting information can be made available for example, to a (possibly software based) renderer (113) that may be able to accurately place the matrix of decoded pixels into a window that is not necessarily in landscape orientation. Another form of use is to have the orientation transformation be performed by a Graphics Processing Unit (GPU) (114), which can be advantageous from a main CPU processing budget, or power savings viewpoint in certain scenarios such as the renderer running on a GPU enabled mobile phone. A further advantage of having the orientation information available at the GPU (114) can be that the GPU (114) may have to operate on the pixels of a reconstructed picture of a coded video bitstream anyway, for example to perform tasks such as color space conversion or resizing. In this case, the GPU (114) can, in some implementations, perform an orientation change without incurring any significant number of cycles or memory access, which also helps saving battery life and CPU cycles. Yet another form of use involves the rendering on a screen that can be physically rotated (known as a swivel screen), similar to the camera head (102). Still another form is reviewed in more detail now. The rendering device (116) can be a tablet PC or a mobile phone, which can have an internal sensor (117) to determine the screen's (115) position relative to the axis of gravity (118). Depending on how the user holds his/her device, the screen (115) of the device (116) is, for example, in landscape or in portrait mode. Depicted device (116) shows the screen (115) in portrait mode, which is the "natural" orientation for the depicted exemplary device. As described below, the combination of the rendering device internal sensor (117) and the orientation information, as available in the video bitstream (110) and decoded by the orientation decoder (112) can ensure that the user always receives a visually pleasing (from an orientation viewpoint) reconstructed picture, regardless of camera (101) or rendering device (116) orientation.

Figure 2:
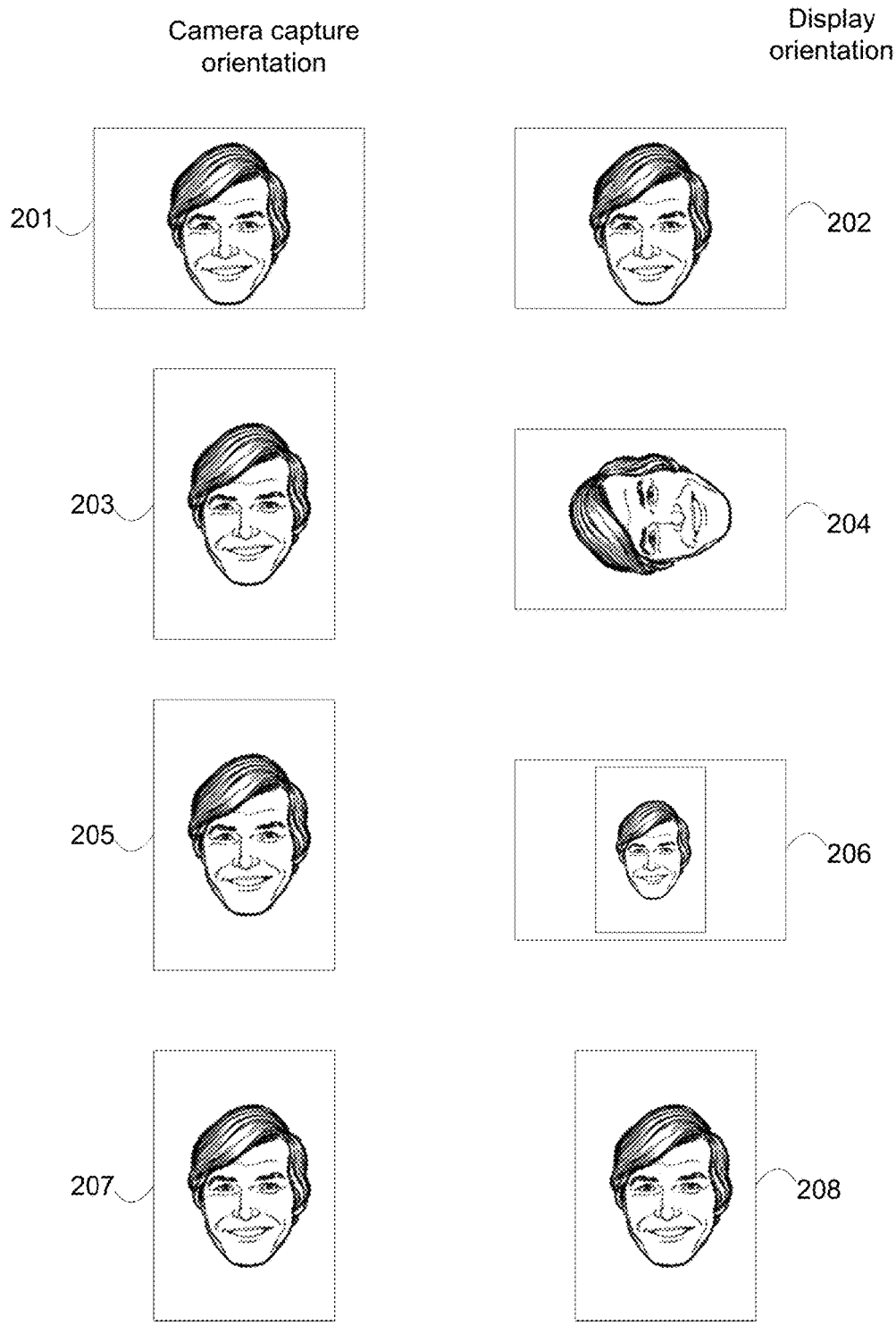
FIG. 2 is a schematic illustration of captured and rendered scenes.

FIG. 2 shows four different configurations of capture orientation and rendering orientation, focusing on portrait and landscape mode only.

In the first scene, the camera (201) captures in landscape mode, and the display orientation (202) is also landscape mode. The orientation of camera (201) and display (202) are identical, and the picture can be rendered appropriately with or without the use of the disclosed techniques.

In the second scene, the camera (203) is rotated 90 degrees clockwise to capture in portrait mode. Without the use of the disclosed subject matter presented, the rendering (after scaling to the maximum available screen real-estate) would look as shown on the display (204). Specifically, the picture appears rotated by 90 degrees and is not useful for human consumption.

In scene three, the camera (205) is again rotated by 90 degrees but orientation information according to the disclosed subject matter is present in the bitstream. The bitstream decoder may not know that the capture orientation is rotated. However, the orientation decoder has determined the orientation in which the bitstream is to be rendered from the bitstream, as already discussed. It can forward the rendering information to the renderer. The renderer may use this information to rotate (and scale, as appropriate) the reconstructed images in order to present them on the display (206) to the viewer in a pleasing way.

In scene four, both camera (207) and screen (208) are rotated by 90 degrees. In the absence of the disclosed subject matter, and when the rendering device does not have an orientation sensor, the reconstructed picture would be rendered correctly. However, increasingly, handheld devices include orientation sensors, and the user interface rotates the screen content, that can include the reconstructed video, accordingly, resulting in a visually unpleasing, rotated image being rendered, similarly to what is shown on display (206) above. However, when orientation information is available in the bitstream, the orientation decoder can decode this information and forward it to the renderer, and the renderer can react to display (208) the picture in the visually pleasing orientation.

Figure 5:
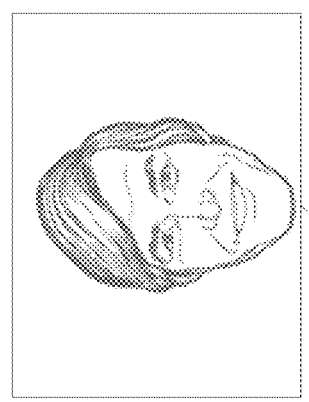
FIG. 5 is a schematic illustration of a captured scenes coded in portrait and landscape mode in accordance with an embodiment of the present invention.

Achieving visually pleasing results directly through rendering of a reconstructed picture "upright", from a viewer's viewpoint, is but one application for the disclosed subject matter. Another exemplary use is described now. For some video content, it has been found that coding a picture in an orientation different from the original orientation (for example in portrait instead of in landscape mode) can be beneficial for the coding efficiency. For pictures that are not square, this orientation change changes the size of the picture, which many modern video coding standards can support. Referring to FIG. 5, shown is a scene in 4:3 landscape format (501). An encoder can process this scene as captured (without orientation change), using normal raster scan order for the macroblocks (502). Each square refers to one macroblock of the 4×3 macroblock sized picture, and the integer numbers shown represent the scan order. According to an embodiment, however, the encoder can also rotate the image before processing, here, for example by 90 degrees clockwise. The picture's size changes, in the example to 3×4 macroblocks. Both this portrait and the landscape image can be coded, using the normal coding tools and the macroblock scan order as indicated. As cross-macroblock prediction properties can change when changing the orientation, so can the number of bits required to code the resulting rotated picture. An encoder can, for example, test two, three, or more different rotations (for example by 0, 90, 180, and 270 degrees), and select the coded image using the least number of bits. These bits, plus the rotation information, enable a decoder to reconstruct an image in the appropriate orientation, which is important not only for the visual experience, but also so to use the reconstructed picture for reference when inter picture prediction is used.

Figure 3:
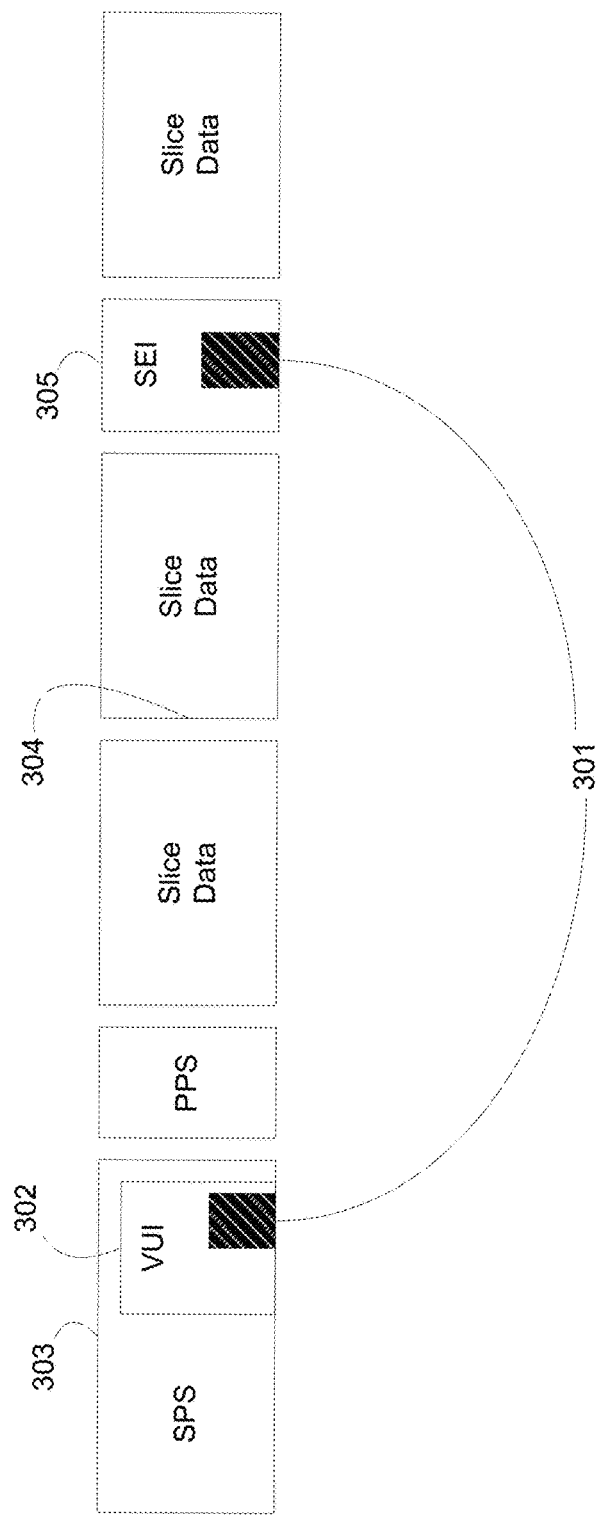
FIG. 3 is a schematic illustration of a video bitstream in accordance with an embodiment of the present invention.

Referring to FIG. 3, and using ITU-T Rec. H.264, incorporated herein by reference, as an example, orientation information (301) can be placed in different parts of the bitstream (after an appropriate modification of the standard syntax and semantics). One location could be the Visual Usability Information (VUI) data structure (302), which is an optional part of the Sequence Parameter Set (SPS) (303). Visual Usability Information, as currently standardized, includes fields such as pixel aspect ratio or color space information that help renderers to appropriately render reconstructed images. Orientation information fits this category. The inclusion of orientation information in a parameter set has the advantage of the information not being subject to losses, which can easily occur to SEI messages (see below).

Another suitable part of an H.264 bitstream would be in a standardized or vendor-specific Supplementary Enhancement Information (SEI) message (305). SEI messages can be placed within a video sequence, at slice (304) or picture boundaries. The use of an SEI message has the advantage of being able to signal different orientation information within a video sequence (as defined in H.264), or beyond a single sequence without changing sequence parameter sets. This can be desirable when the orientation of a camera can change in mid sequence and orientation information is to be sent synchronized with the video bits. However, SEI messages are not presumed to be conveyed reliably and, as a result, orientation information can get lost, resulting in visually displeasing rendering of video content as already discussed above.

The aforementioned options are not mutually exclusive, and, in some scenarios, it can be a sensible design choice to use both simultaneously, with SEI messages overriding information present in the parameter set.

Depending on the video coding bitstream format, other places in the bitstream can equally be appropriate, such as GOP or picture header, slice header, picture parameter set, and so forth. For an H.264 (and similar) standards based implementation, the appropriate placement for orientation information to support coding efficiency can be those parts of the bitstream required for the decoding process, such as for example the picture parameter set. The use of SEI messages or the VUI is inadvisable in this case, because, in order to generate a reference picture after decoding, a decoder necessarily needs to know, for each picture, whether the orientation needs to be changed.

Figure 4:
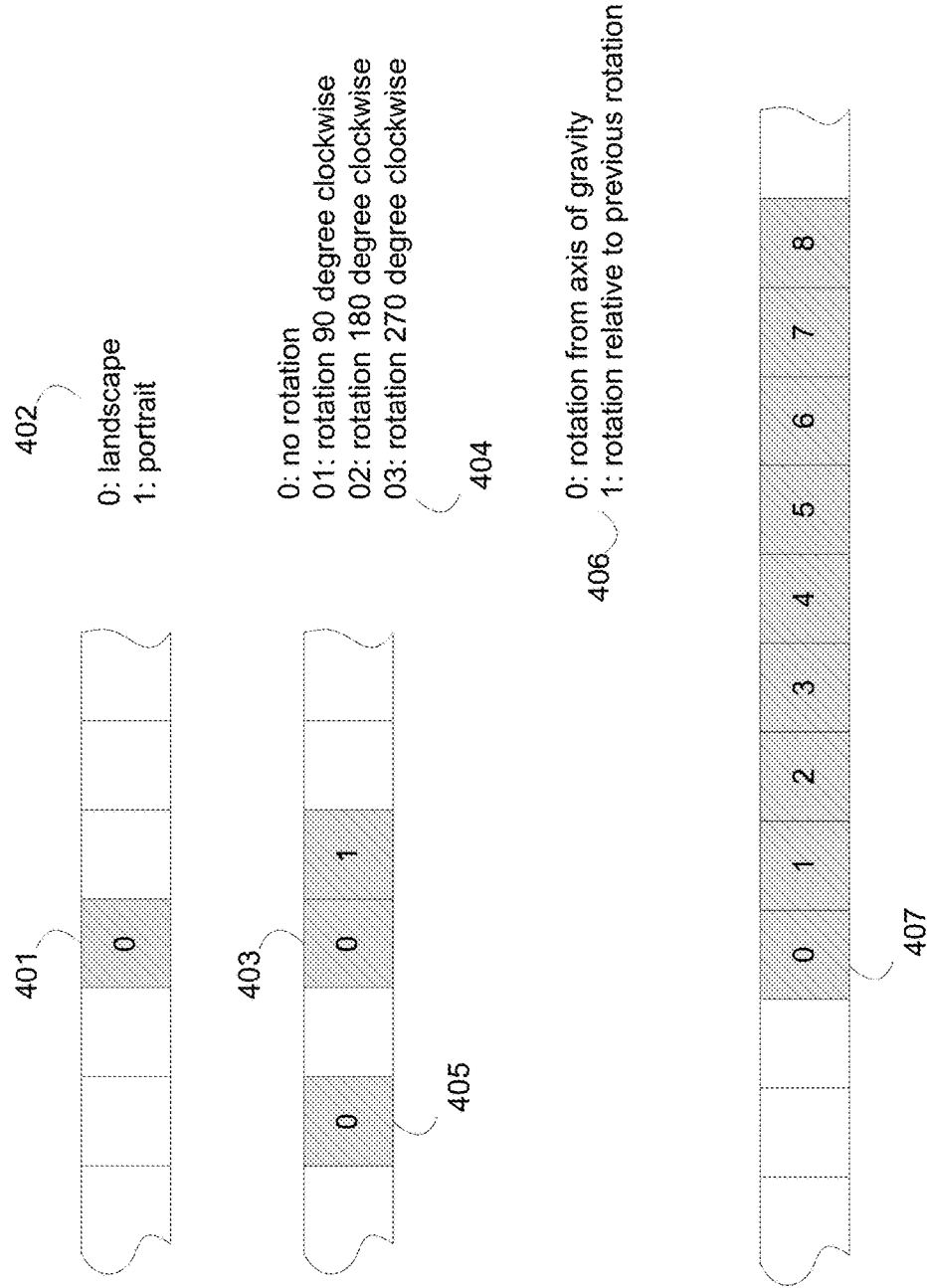
FIG. 4 is a schematic illustration of exemplary representations of orientation information in accordance with an embodiment of the present invention.

Referring to FIG. 4, orientation information can be represented in different formats in the bitstream, some of which are discussed below. The formats differ, amongst other things, in their granularity of indicating the orientation, and the resulting number of bits that are needed to code them in a bitstream.

One format can be coded in a single bit (401), indicating "landscape" or "portrait" mode (402). Given the traditional preference of TV signals for landscape, "portrait" can refer to a camera rotation of 90 degrees clockwise. For the use scenarios discussed above in conjunction with FIG. 2 above, this information is already sufficient to provide the mentioned functionality.

Another format consist of two bits (403), indicating rotation, for example, clockwise, by 0, 90, 180, 270 degrees (404). This information can be inferred to be relative to the gravitational axis, relative to previously received orientation information, or in a different context. This information can either be standardized (and, therefore, implicitly assumed when orientation information is found in the bitstream), or explicitly signaled. For example, bit (405) can indicate "absolute from axis of gravity" (when set to zero) or "relative to previous orientation" (when set to 1) (406). The incremental information coding is most appropriate when dynamic changes of the orientation are expected, and the orientation information is coded in an SEI message.

Finer granularities of the degree of rotation are also possible. For example, a 9 bit integer (407) can be used to indicate rotation between 0 and 359 degrees in a one degree granularity (using 360 values of the 512 value space a 9 bit number provides).

The use of floating point is equally possible.

In some applications, it can be advisable to signal a flip of the picture, horizontally or vertically, so to allow for accurate rendering of mirrored images.

All aforementioned representations of rotation can, in some environments, benefit from information indicating the persistence of the rotation information and/or the frequency in which a decoder can expect to receive refreshes or updates of the rotation information. This can be particularly useful considering that SEI messages are highly likely to be subject to losses, as their transport priority, as indicated in the nal_ref_idc field in the NAL unit header of the SEI message, is required to be zero, indicating a disposable NAL unit. A decoder that becomes aware of a possible loss of an SEI message containing the rotation information, for example through a timeout of an interval specified by persistence information, can appropriately react, for example by assuming that the rotation has not changed, based on statistical analysis of the frequency of previous rotation changes. The persistence information can be expressed in any suitable entropy coding format (i.e. integer, floating point, CABAC coded integer), and can be measured, for example, in time (milliseconds), frame intervals, or picture order count intervals.

All aforementioned information can be placed in the bitstream directly, or entropy coded using the entropy coding scheme of the video compression technology in use. For example, in the context of H.264, the values can be binary coded, or coded following the entropy coding mechanisms of CA-VLC, or CABAC.

It will be understood that in accordance with the disclosed subject matter, the rotation information coding techniques described herein can be implemented using any suitable combination of hardware and software. The software (i.e., instructions) for implementing and operating the aforementioned rate estimation and control techniques can be provided on computer-readable media, which can include, without limitation, firmware, memory, storage devices, microcontrollers, microprocessors, integrated circuits, ASICs, on-line downloadable media, and other available media.

Computer System

The methods for video coding described above, can be implemented as computer software using computer-readable instructions and physically stored in computer-readable medium. The computer software can be encoded using any suitable computer languages. The software instructions can be executed on various types of computers. For example, FIG. 6 illustrates a computer system 600 suitable for implementing embodiments of the present disclosure.

Figure 6:
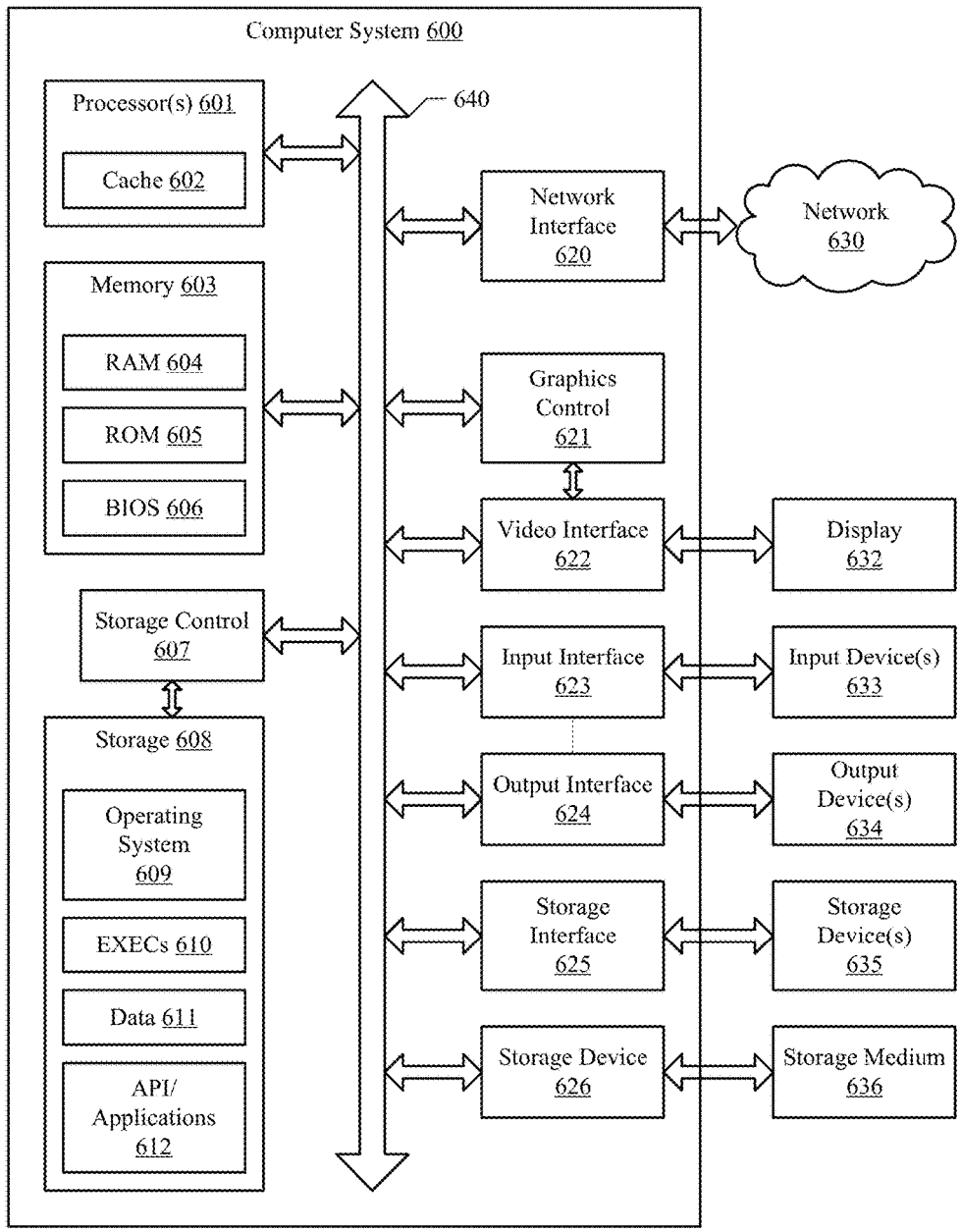
FIG. 6 is a schematic illustration of a computer system in accordance with embodiments of the present invention.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

We claim:

1. A method of video decoding comprising:
   retrieving, by a decoding device, from a Supplementary Enhancement Information (SEI) message included in a coded video bitstream, orientation information relating to at least all samples of a first coded picture and at least all samples of a second coded picture after decoding;
   wherein the orientation information comprises a bit indicating a vertical flip and persistence information pertaining to persistence of the orientation information.

2. The method of claim 1, further comprising: using the orientation information for rendering at least one reconstructed video picture.

3. The method of claim 1, wherein the orientation information further comprises an integer number, indicating a rotation angle measured in degrees or fractions thereof.

4. The method of claim 1, wherein the persistence information comprises a number indicating a persistency measured in a picture order count interval.

5. The method of claim 3, wherein the integer number comprises at least 9 bits.

6. The method of claim 1, wherein the persistence information comprises a binary coded number indicating the persistence of the orientation information.

7. The method of claim 1, further comprising:
   retrieving, by the decoding device, from a second SEI message included in the coded video bitstream, a second orientation information relating to at least all samples of a third coded picture after decoding;
   wherein the second orientation information replaces the orientation information, and
   wherein the third picture is located after the first and second pictures in the coded video bitstream.

8. A system for video decoding comprising:
   an orientation decoder configured to extract from a coded video bitstream a Supplementary Enhancement Information (SEI) message comprising orientation information, the orientation information relating to at least all samples of a first coded picture and at least all samples of a second coded picture after decoding;
   wherein the orientation information comprises a bit indicating a vertical flip and persistence information pertaining to persistence of the orientation information.

9. The system of claim 8, wherein the orientation decoder is coupled to a renderer configured to render at least one reconstructed picture according to the orientation information extracted and decoded from the bitstream.

10. The system of claim 9, wherein the renderer comprises a Graphics Processing Unit.

11. The system of claim 8, wherein:
the orientation decoder is further configured to extract from the coded video bitstream a second SEI message comprising a second orientation information and decode the second orientation information, the second orientation information relating to least all samples of a third coded picture after decoding; wherein the second orientation information replaces the orientation information, and
wherein the third picture is located after the first and second pictures in the coded video bitstream.

12. A non-transitory computer readable medium comprising a set of executable instructions to direct a processor to perform the method of claim 1.

13. A non-transitory computer readable medium comprising a set of executable instructions to direct a processor to perform the method of claim 2.

14. A non-transitory computer readable medium comprising a set of executable instructions to direct a processor to perform the method of claim 3.

15. A non-transitory computer readable medium comprising a set of executable instructions to direct a processor to perform the method of claim 4.

\* \* \* \* \*